Nov. 9, 1943.  L. A. McNABB  2,333,728
MOTION PICTURE MECHANISM FOR PROJECTING MOTION PICTURES
Filed Sept. 8, 1941  2 Sheets-Sheet 1

INVENTOR
LOUIS A. McNABB
BY
ATTY.

INVENTOR
LOUIS A. MCNABB

Patented Nov. 9, 1943

2,333,728

UNITED STATES PATENT OFFICE 2,333,728

MOTION PICTURE MECHANISM FOR PROJECTING MOTION PICTURES

Louis A. McNabb, Evanston, Ill., assignor to The Bell & Howell Company, Chicago, Ill., a corporation of Illinois Application September 8, 1941, Serial No. 410,049

3 Claims. (Cl. 88—19.3)

My invention relates particularly to motion picture mechanism for projecting motion pictures for television scanning, and has for its general object the provision of such a mechanism which increases the projection frequency without correspondingly increasing the feed frequency of the film being projected, toward the end of attaining a desirable relatively high television scanning frequency without undesirably increasing the feed frequency of the film.

With this object in view, my invention consists in certain features of novelty by which the said object and certain other objects, hereinafter appearing, are effected, all as fully described with reference to the accompanying drawings and more particularly pointed out in the appended claims.

In the said drawings—

Figures 1, 4:
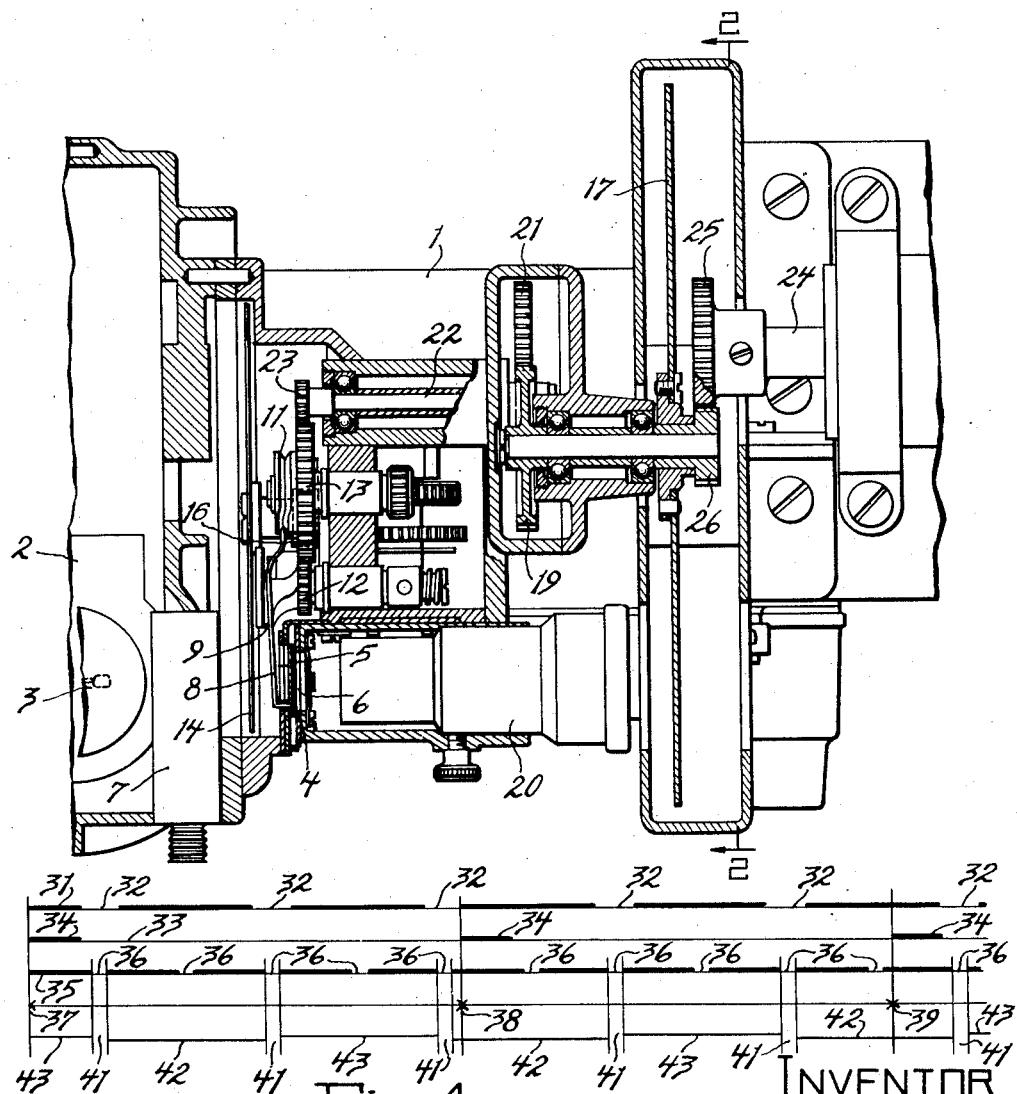
Figure 1 is a partial top plan sectional view of a motion picture projecting machine embodying my invention.
Figure 4 is a diagram illustrating the functioning of my invention.

Referring to the drawings, 1 designates generally the frame of a motion picture projecting machine which is provided at the rear thereof with a lamp housing 2 having therein a source of light in the form of an incandescent electric lamp 3. See Figure 1. Disposed forwardly of the lamp house is a film feed guide 4 adapted to have a motion picture film 5 fed therethrough and provided with a projection aperture 6 through which light from the lamp 3 is projected forwardly through a condensing lens unit 7 as is usual. The film 5 is intermittently fed through the guide 4, as is usual in motion picture mechanism to bring successive "frames" or pictures of the film into registry with the aperture 6 by means of an intermittent film feed mechanism, see Figures 1 and 2, consisting of a toothed feed shuttle 8 mounted for reciprocating feed movement vertically of the guide and for oscillating film engaging and disengaging movement in a horizontal plane, a revoluble feed cam 9 operative on the shuttle to vertically reciprocate the same, a revoluble cam 11 operative on the shuttle to oscillate the same, a gear 12 fixed with the feed cam 9, and a gear 13 fixed with the cam 11 and meshing with the gear 12 for rotating the cams in timed relation.

The film feed mechanism shown is similar to that disclosed and claimed in U. S. Patent #1,680,295, issued August 14, 1928, on application of Albert S. Howell, and requires no further description for the present purpose except to state that the gear 13 is larger than the gear 12, as shown in the ratio of three to one, so that the shuttle 8 is engaged with the film 5 to feed the same but once during each three revolutions of the feed cam 9, thus effecting a relatively short film feed period.

A rotatably mounted light shutter disk 14, provided with but one light opening 15, is operatively related with the projection aperture 6 of the guide 4 at the rear of the guide and between the aperture and the lamp 3, and is rotated in phase relation with the intermittent feed mechanism to cut off the projection light during feeding of the film in the guide by means of a gear 16 secured with the shutter disk and meshing with the gear 13.

A second rotatably mounted shutter disk 17, provided with but one light opening 18, is operatively related with the projection aperture 6 of the guide 4 forwardly of the guide, and a projection lens 20 alined with the aperture 6, and is rotated in phase relation with the intermittent feed mechanism and the shutter disk 14 by means of a gear 19 fixed with the disk 17 and meshing with a gear 21 fixed on a revoluble shaft 22, and a gear 23 fixed on the shaft 22 and meshing with the gear 13. The shutter disks and the intermittent feed mechanism are driven from a drive shaft 24 by means of a gear 25 fixed on the drive shaft and meshing with a gear 26 fixed with the shutter disk 17.

The ratio of the gears 12 and 16 is such that the exposure frequency of the shutter disk 14 exceeds the feed frequency of the intermittent feed mechanism in a ratio of at least one and a fraction of the exposure frequency to one of the feed frequency. As shown, the pitch diameter of the gear 12 is five-sixths that of the gear 16, so that the exposure frequency of the shutter disk 14 is two and one-half times the feed frequency of the intermittent feed mechanism, it being noted that the feed cam 9 effects a feed movement of the film 5 but once during each three revolutions of the feed cam.

The gears 19, 21, 23, 13 and 16 are so proportioned that the shutter disk 17 rotates a plurality of revolutions, as shown two, to one revolution of the shutter disk 14, the shutter disk 17 thus having a plurality, as shown two, of exposure cycles to one exposure cycle of the shutter disk 14.

Figure 2:
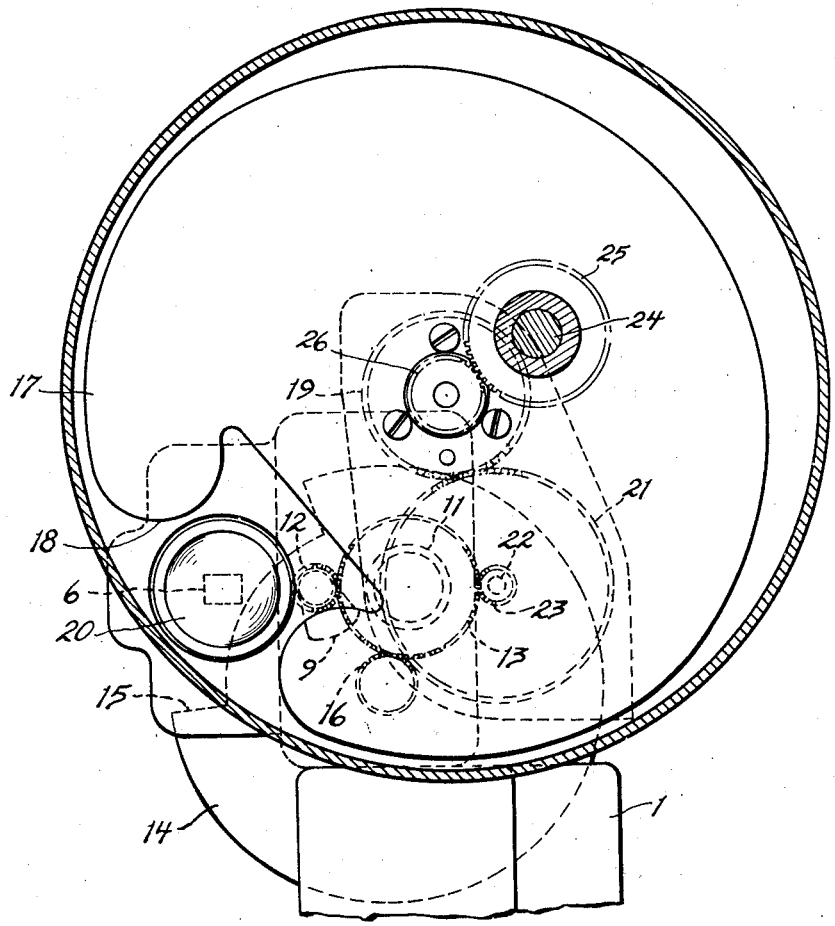
Figure 2 is a sectional view substantially on the line 2—2 of Figure 1.
Figure 3:
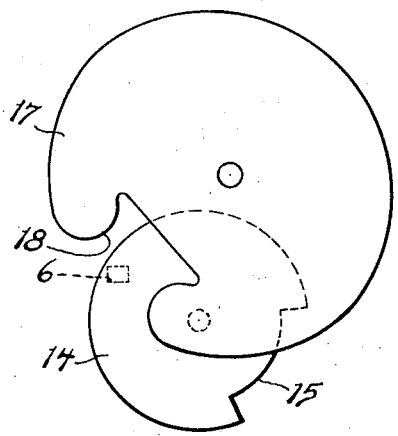
Figure 3 is a view of the shutter elements of my invention, showing them in different positions than those in which they are shown in Figure 2.

The feed period of the intermittent feed mechanism, of course, occurs during the non-exposure periods of the shutter disks 14 and 17, and the shutter disks are timed so that the light openings 15 and 18 thereof simultaneously register with the projection aperture 6 of the film guide, see Figure 1, for picture projection once during each exposure cycle or revolution of the low speed shutter disk 14, the light opening 18 of the high speed shutter disk 17 registering with the projection aperture during the non-exposure period of the shutter disk 14 during alternate revolutions of the shutter disk 17, as shown in Figure 3.

The exposure period of the shutter disk 14 is greater than that of the shutter disk 17 and overlaps that of the latter in both directions so that the shutter disk 17 functions to cut on and cut off the projection and effects a relatively short projection period. The axis of the shutter disk 17 is spaced from the exposure aperture 6 a greater distance than is the axis of the shutter disk 14 and, because of this condition and the fact that the shutter disk 17 has a relatively great angular speed, the cut on and cut off of the projection is correspondingly quick, the high angular speed of the shutter disk 17 permitting the same to be of smaller diameter than would otherwise be the case for a corresponding cut on and cut off speed.

Preferably, one of the shutter disks, as shown the shutter disk 14, is disposed at the rear of the film guide 4 and between the aperture 6 of the guide and the light projecting means, exemplified by the lamp 3, so that this shutter disk acts as a fire shutter during the non-projection periods of the mechanism to prevent damage to the film 5 from overheating.

Referring to Figure 4, the horizontal line 31 indicates the functioning of the slow speed shutter disk 14, the exposure periods of which are indicated at 32; the horizontal line 33 indicates the functioning of the intermittent feed mechanism, the feed periods of which are indicated at 34; the horizontal line 35 indicates the functioning of the high speed shutter disk 17, the exposure periods of which are indicated at 36; and the space between the vertical lines 37 and 38 indicate one feed cycle of the feed mechanism and the space between the vertical lines 38 and 39 indicate a succeeding feed cycle of the feed mechanism.

As will be seen, the shutter disk 14 has a uniform exposure frequency of two and one-half times that of the uniform feed frequency of the feed mechanism, and the shutter disk 17 has a uniform exposure frequency of twice that of the shutter disk 14 and has alternate exposure periods thereof registering simultaneously with those of the shutter disk 14, with the result that picture projections, indicated at 41, occur at a frequency of two and one-half times the feed frequency of the feed mechanism.

For television, it is contemplated that pictures be projected upon a fluorescent screen, not shown, which retains a picture for a short period of time, the picture images on the screen being scanned for television in a suitable manner by alternate "odd" and "even" scans indicated respectively at 42 and 43 in Figure 4 and the "vertical" blanking time of the scanning occurring during the projection periods 41 which are of relatively short duration.

In television, it is usual to make two scans (respectively odd and even) for each motion picture frame fed or presented for projection. Motion picture feed or presentation frequency has been more or less standardized, particularly where sound motion pictures are employed, say, at twenty-four frames per second. Likewise, television has been more or less standardized, say, to a scanning frequency of sixty scans per second. Assuming two scans per motion picture frame presented for projection at a presentation frequency of twenty-four per second, the scanning frequency is only forty-eight per second.

My invention, by effecting a motion picture projection frequency exceeding the feed or presentation frequency in a ratio of at least one and a fraction of the projection frequency to one of the feed or presentation frequency, meets the above situation—instantly the projection frequency exceeding the feed or presentation frequency in the ratio of two and one-half of the projection frequency to one of the presentation frequency, with the result that, assuming a feed or presentation frequency of twenty-four frames per second, the projection or scanning frequency is the equivalent of a feed or presentation frequency of thirty frames per second at two projections or scans per feed or presentation.

While I have thus described my invention, I do not wish to be limited to the precise details described, as changes may be readily made without departing from the spirit of my invention, but having thus described my invention, I claim as new and desire to secure by Letters Patent the following:

1. In a motion picture projecting mechanism, the combination with a projection apertured film guide and means for projecting light from the rear and forwardly through the projection aperture of said guide, of a revoluble light shutter disk operatively related with said aperture at the rear of said guide and between said aperture and said light projecting means, a second revoluble light shutter disk operatively related with said aperture forwardly of said guide, means for intermittently feeding a motion picture film through said guide, means for actuating said shutter disks in phase relation and said second shutter disk a plurality of exposure cycles to one of said first mentioned shutter disk and operative to simultaneously register light openings of said disks with said aperture once during each exposure cycle of said first mentioned shutter disk, and means for actuating said feeding means and said first mentioned shutter disk in phase relation and said first mentioned shutter disk at an exposure frequency exceeding the feed frequency of said feeding means in a ratio of at least one and additionally a fraction of said exposure frequency to one of the feed frequency.

2. In a motion picture projector, the combination with a projection apertured film guide and means for projecting light from the rear and forwardly through the projection aperture of said guide, of a revoluble light shutter disk operatively related with said aperture at the rear of said guide and between said aperture and said light projecting means and provided with but one light opening, a second revoluble light shutter disk operatively related with said aperture forwardly of said guide and provided with but one light opening, and means for rotating said shutter disks in phase relation and said second disk a plurality of revolutions to one revolution of said first mentioned disk and operative to simultaneously register the light openings of said disks with said aperture once during each revolution of said first mentioned disk, the exposure period of said first mentioned disk being greater than that of said second disk and overlapping that of said second disk in both directions, and the axis of said second disk being spaced from said aperture a greater distance than is the axis of said first mentioned disk.

3. In a motion picture projecting mechanism, the combination with a projection apertured film guide and means for projecting light from the rear and forwardly through the projection aperture of said guide, of a revoluble light shutter disk operatively related with said aperture at the rear of said guide and between said aperture and said light projecting means, a second revoluble light shutter disk operatively related with said aperture forwardly of said guide, means for intermittently feeding a motion picture film through said guide, means for actuating said shutter disks in phase relation and said second shutter disk a plurality of exposure cycles to one of said first mentioned shutter disk and operative to simultaneously register light openings of said disks with said aperture once during each exposure cycle of said first mentioned shutter disk, and means for actuating said feeding means and said first mentioned shutter disk in phase relation and said first mentioned shutter disk at an exposure frequency exceeding the feed frequency of said feeding means in the ratio of two and one-half times of the exposure frequency to one of the feed frequency.

LOUIS A. McNABB.